United States Patent
Aoyama et al.

(10) Patent No.: US 7,069,500 B2
(45) Date of Patent: Jun. 27, 2006

(54) DOCUMENT MANAGEMENT/EDI SYSTEM LINKAGE UNIT, DOCUMENT MANAGEMENT/EDI SYSTEM LINKAGE METHOD, INFORMATION RECORDING MEDIUM AND DOCUMENT PROCESSING PROGRAM

(75) Inventors: Yuki Aoyama, Sagamihara (JP); Toru Takahashi, Kamakura (JP); Yoshifumi Yamashita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 517 days.

(21) Appl. No.: 10/066,405

(22) Filed: Jan. 31, 2002

(65) Prior Publication Data

US 2002/0129045 A1    Sep. 12, 2002

(30) Foreign Application Priority Data

Mar. 6, 2001    (JP)    ............................. 2001-062240

(51) Int. Cl.
G06F 17/00    (2006.01)

(52) U.S. Cl. ...................................... 715/511; 709/206
(58) Field of Classification Search ................ 715/511, 715/530; 707/100, 9; 703/27; 709/246, 709/223; 705/37; 719/330
See application file for complete search history.

(56) References Cited

U.S. PATENT DOCUMENTS

| | | | | |
|---|---|---|---|---|
| 5,557,780 | A  * | 9/1996 | Edwards et al. | 703/27 |
| 5,761,661 | A  * | 6/1998 | Coussens et al. | 707/9 |
| 5,813,009 | A  * | 9/1998 | Johnson et al. | 707/100 |
| 6,125,391 | A  * | 9/2000 | Meltzer et al. | 709/223 |
| 6,842,906 | B1 * | 1/2005 | Bowman-Amuah | 719/330 |
| 6,868,401 | B1 * | 3/2005 | Carpenter et al. | 705/37 |
| 6,889,260 | B1 * | 5/2005 | Hughes | 709/246 |

FOREIGN PATENT DOCUMENTS

| | | |
|---|---|---|
| JP | 11-161702 | 6/1999 |
| JP | 2000-029672 | 1/2000 |

* cited by examiner

*Primary Examiner*—William Bashore
*Assistant Examiner*—James H Blackwell
(74) *Attorney, Agent, or Firm*—Townsend and Townsend and Crew LLP

(57) ABSTRACT

This art can manage a preparation history of a transaction document and a send and receive history by EDI in a centralized manner. When the transaction document and the version are selected and attached to the EDI data, then the EDI data is sent, a means that links a document management means and an EDI means registers sending information of the EDI data in version control information of the relevant transaction document.

9 Claims, 15 Drawing Sheets

| PREPARATION HISTORY | | | SEND AND RECEIVE HISTORY |
|---|---|---|---|
| VERSION NAME | IMPLEMENTOR | CREATION DATE | EDI DATA ID |
| FIRST VERSION | YAMADA | NOV. 6, 2000 | — |
| REVIEWED VERSION | SATO | NOV. 15, 2000 | — |
| MODIFIED VERSION | SUZUKI | NOV. 20, 2000 | — |

FIG. 8(a)

| PREPARATION HISTORY | | | SEND AND RECEIVE HISTORY |
|---|---|---|---|
| VERSION NAME | IMPLEMENTOR | CREATION DATE | EDI DATA ID |
| FIRST VERSION | YAMADA | NOV. 6, 2000 | — |
| REVIEWED VERSION | SATO | NOV. 15, 2000 | — |
| MODIFIED VERSION | SUZUKI | NOV. 20, 2000 | 10002 |

| EDI DATA ID | TRANSACTION NO. | TYPE | SENDER | SENDING DATE |
|---|---|---|---|---|
| 10000 | 101 | SENDING | COMPANY A | OCT. 30, 2000 |
| 10001 | 122 | RECEIVING | COMPANY C | NOV. 2, 2000 |
| 10002 | 255 | SENDING | COMPANY A | NOV. 28, 2000 |
| ... | ... | ... | ... | ... |

| PREPARATION HISTORY | | | SEND AND RECEIVE HISTORY |
|---|---|---|---|
| VERSION NAME | IMPLEMENTOR | CREATION DATE | EDI DATA ID |
| FIRST VERSION | YAMADA | NOV. 6, 2000 | — |
| REVIEWED VERSION | SATO | NOV. 15, 2000 | — |
| MODIFIED VERSION | SUZUKI | NOV. 20, 2000 | 10002 |
| — | — | — | 10003 |

| EDI DATA ID | TRANSACTION NO. | TYPE | SENDER | SENDING DATE |
|---|---|---|---|---|
| 10000 | 101 | SENDING | COMPANY A | OCT. 30, 2000 |
| 10001 | 122 | RECEIVING | COMPANY C | NOV. 2, 2000 |
| 10002 | 255 | SENDING | COMPANY A | NOV. 28, 2000 |
| 10003 | 255 | RECEIVING | COMPANY B | DEC. 1, 2000 |
| ... | ... | ... | ... | ... |

| PREPARATION HISTORY | | | SEND AND RECEIVE HISTORY | |
|---|---|---|---|---|
| VERSION NAME | IMPLEMENTOR | CREATION DATE | EDI DATA ID | 1001 |
| V1 | TAKAHASHI | DEC. 18, 2000 | — | |
| V2 | KATO | JAN. 4, 2001 | — | |
| V3 | YAMAGUCHI | JAN. 15, 2001 | 22222 | |

⇩ DISABLE SENDING

FIG. 10(b)

| PREPARATION HISTORY | | | SEND AND RECEIVE HISTORY | |
|---|---|---|---|---|
| VERSION NAME | IMPLEMENTOR | CREATION DATE | EDI DATA ID | 1002 |
| V1 | TAKAHASHI | DEC. 18, 2000 | — | |
| V2 | KATO | JAN. 4, 2001 | — | |
| V3 | YAMAGUCHI | JAN. 15, 2001 | — | |

FIG. 17

◆ HISTORY LIST

| # | PREPARATION HISTORY | | | SEND AND RECEIVE HISTORY | | | |
|---|---|---|---|---|---|---|---|
| | VERSION NAME | IMPLEMENTOR | CREATION DATE | TRANSACTION NO. | TYPE | SENDER | SENDING DATE |
| 1 | FIRST VERSION | YAMADA | NOV. 6, 2000 | — | — | — | — |
| 2 | REVIEWED VERSION | SATO | NOV. 15, 2000 | — | — | — | — |
| 3 | MODIFIED VERSION | SUZUKI | NOV. 20, 2000 | 255 | SENDING | COMPANY A | NOV. 28, 2000 |
| 4 | — | — | — | 255 | RECEIVING | COMPANY B | DEC. 1, 2000 |
| 5 | REMODIFIED VERSION | SUZUKI | DEC. 11, 2000 | 255 | SENDING | COMPANY A | DEC. 15, 2000 |

DOCUMENT MANAGEMENT/EDI SYSTEM LINKAGE UNIT, DOCUMENT MANAGEMENT/EDI SYSTEM LINKAGE METHOD, INFORMATION RECORDING MEDIUM AND DOCUMENT PROCESSING PROGRAM

FIELD OF THE INVENTION

The present invention relates to a document management system for preparing, accumulating, and updating a document, and an EDI (Electronic Data Interchange) system for performing an electronic transaction.

BACKGROUND OF THE INVENTION

With the spread of the Internet, various electronic businesses are highlighted. To enable computerization of a transaction in particular, the standardization of an EDI protocol in which send and receive methods and data formats of transaction information are defined and the preparation of an industrial infrastructure for performing an electronic transaction using the EDI protocol are advancing. Further, to improve the efficiency of various operations, the preparation of an in-house business system for creating, accumulating, and managing in-house resources, such as business data and documents, in a centralized manner is also advancing. Moreover, resources, such as transaction data and transaction documents, used in the electronic transaction are frequently created, accumulated and managed by this in-house business system. For example, there are a merchandise control system that manages merchandise data and customer data which become the objects of a commercial transaction, a material system that manages received order and ordering data, and a document management system for managing transaction documents, such as a bill and a bill of lading (B/L) for trade.

Further, Japanese Unexamined Patent Publication No. 2000-29672 describes a method for performing the delivery management of software that is not related to an electronic transaction. In the art of the publication, which version of which module of the software to be distributed was distributed is managed as a history every distribution, and the history is used later to redistribute the software.

In such background as this, the demand for the seamless linkage of an EDI system for performing an electronic transaction with an in-house business system has increased. For example, in the in-house business system, the efficiency in the data and document interchange between the in-house business system and the EDI system can be improved by fetching the data necessary for the electronic transaction from the business data managed in a centralized manner, automatically creating input data into the EDI system, attaching an accumulated transaction document to EDI data, and automatically accumulating a transaction document sent from a customer in the in-house business system.

FIG. 14 shows an example when a document management system and an EDI system are linked. The document management system of FIG. 14 prepares and updates a transaction document, such as a bill or a bill of lading (B/L). Further, the EDI system creates EDI data including a transaction No. (transaction number), a sender, a receiver, and a sending date. On this occasion, the transaction document prepared by the document management system is selected and attached to the EDI data. The EDI system sends the EDI data to which the transaction document was attached to a customer or receives the EDI data from the customer.

As described above, when the in-house business system and the EDI system are linked, a history indicating when which transaction data and transaction document of the in-house business system were actually interchanged with a customer as the EDI data needs to be able to be managed, a transaction be advanced continuously, and the history be referred to when a trouble occurred. However, when the document management system and the EDI system are linked, simply leaving the history indicating which transaction document was interchanged with the customer as the EDI data by such method as Japanese Unexamined Patent Publication No. 2000-29672 will cause the following problems (1), (2), (3) and (4).

(1) A transaction document is prepared and updated by multiple persons in an enterprise, and the same document is frequently used for a transaction multiple times. FIG. 15 shows the example. In FIG. 15, a person in charge A prepares a bill and a bill of lading (B/L), and a person in charge B modifies the bill of lading (B/L). Subsequently, the person in charge B attaches the bill and the modified bill of lading (B/L) to EDI data and sends the EDI data. Further, the person in charge A remodifies the bill and the bill of lading (B/L) and attaches them to the EDI data, then resends the EDI data. The preparation and modification operations of the transaction document and the EDI transaction operations are performed complicatedly in this manner. Accordingly, to efficiently advance these operations, the preparation history of the transaction document, that is, the version information of the transaction document and the transaction history of the EDI data need to be able to be managed in a centralized manner and referred to easily.

(2) The EDI system negotiates transaction contents by repetitively interchanging EDI data with a customer and establishes a transaction in the end. Accordingly, a transaction document prepared by the customer may be attached to the received EDI data or the customer may modify and return the sent transaction document. FIG. 16 shows one of the examples. In FIG. 16, the company B modifies the transaction document sent from the company A to the company B and returns it to the company A. The company A remodifies the transaction document that the company B modified and resends it. Accordingly, a document management system needs also to be able to update the received transaction document. However, as described in Japanese Unexamined Patent Publication No. 2000-29672, such receiving information as described above cannot be managed and reused using an art that controls a version of software only at the distribution side one-sidedly and manages only a distribution history.

(3) The EDI system may fail in EDI data sending or disable the sending, such as a transaction is canceled, due to a time limit after the EDI data is sent. Even when such sending is disabled, it is not known that the sending was disabled only by managing the distribution history like the art described in Japanese Unexamined Patent Publication No. 2000-29672.

(4) In the case of the EDI system, a customer updates a sent document and returns it. Accordingly, if a transaction document is freely modified in an enterprise while a response from the customer is being awaited after the transaction document is sent, a double update will occur, and consistency of the transaction document will not be achieved. That is, it will be unknown that the document of which version is to be updated next or the document of which version is to be sent when the document is resent.

In view of these problems, Issues of the present invention are as follows: (a) A preparation history of a transaction document and a transaction history of EDI data to which this preparation history was attached can be associated and managed. (b) An interchange history of the transaction document with a customer can be managed with consistency. (c) The efficiency of the preparation operations of the transaction document and the transaction operations of the EDI data can be improved. (d) Operations histories can be referred to easily.

An object of the present invention is to provide an art that can solve these issues.

SUMMARY OF THE INVENTION

The present invention has been made in view of the above circumstances and provides a document management/EDI system linkage unit, a document management/EDI system linkage method, an information recording medium and a document processing program.

(1) According to an aspect of the present invention, the document management/EDI system linkage unit has a document management means having an accumulation means that assigns a version to a prepared transaction document and accumulates the document and a version control means that manages version control information for the accumulation, an EDI means that creates and sends EDI data for an electronic transaction and a linkage means that links the document management means and the EDI means and registers sending information of the EDI data in the version control information of the relevant transaction document when the accumulated transaction document and the version are selected and attached to the EDI data, then the EDI data is sent.

(2) According to another aspect of the present invention, the document management/EDI system linkage unit has the above 1, wherein the EDI means is provided with a means for receiving EDI data, and, the linkage means, when a transaction document is attached to the received EDI data and the transaction document that corresponds to the attached document is already managed by the document management means, accumulates the attached document as the latest version of the relevant transaction document, and, when the relevant transaction document is not managed, accumulates the attached document as the first version of a new document and registers receiving information of the EDI data in the version control information.

(3) According to another aspect of the invention, the document management/EDI system linkage unit has the above (1) or (2), wherein the linkage means deletes the sending information of the EDI data from the version control information when a sending error occurs or sending is disabled in the EDI data sent by the EDI means.

(4) According to another aspect of the invention, the document management/EDI system linkage unit has the above (1), (2) or (3), wherein the document management means is provided with a lock means for temporarily inhibiting the update of a document, and the linkage means temporarily inhibits the update of the relevant transaction document using the lock means when the transaction document is sent by the EDI means, and cancels update inhibition at least when the transaction document is received, a transaction is terminated, and sending is disabled.

(5) According to another aspect of the present invention, the document management/EDI system linkage method has a document management step having an accumulation step that assigns a version to a prepared transaction document and accumulates the document and a version control step that manages version control information for the accumulation, an EDI step that creates and sends EDI data for an electronic transaction and a linkage step that links the document management step and the EDI step and registers the sending information of the EDI data in the version control information of the relevant transaction document when the accumulated transaction document and the version are selected and attached to the created EDI data, then the EDI data is sent.

(6) According to another aspect of the present invention, the document management/EDI system linkage method has the above (5), wherein the EDI step has a step that receives EDI data, and, the linkage step, when a transaction document is attached to the received EDI data and the transaction document that corresponds to the attached document is already managed by the document management means, accumulates the attached document as the latest version of the relevant transaction document, and, when the transaction document is not managed, accumulates the attached document as the first version of a new document and registers the receiving information of the EDI data in the version control information.

(7) According to another aspect of the present invention, the document management/EDI system linkage method has the above (5) or (6), wherein the linkage step deletes the sending information of the EDI data from the version control information when a sending error occurs or sending is disabled in the EDI data sent in the EDI step.

(8) According to another aspect of the present invention, the document management/EDI system linkage method has the above (5), (6) or (7), wherein the document management step includes a step that temporarily inhibits the update of a document, and the linkage step temporarily inhibits the update of the relevant transaction document by the lock control step when the transaction document was sent through the EDI step, and, cancels update inhibition at least when the transaction document is received, a transaction is terminated, and sending is disabled.

(9) According to another aspect of the present invention, the information recording medium has the contents that can be read on a computer, and records a program for executing:

a document management procedure including a procedure that assigns a version to a prepared transaction document and accumulates the document and a procedure that manages version control information for the accumulation;

an EDI procedure that creates and sends EDI data for an electronic transaction; and a linkage procedure that links the document management procedure and the EDI procedure and registers sending information of the EDI data in the version control information of the relevant transaction document when the accumulated transaction document and the version are selected and attached to the EDI data, then the EDI data is sent.

(10) According to another aspect of the present invention, the information recording medium has the above (9), wherein the EDI step has a step that receives EDI data, and, the linkage step, when a transaction document is attached to the received EDI data and the transaction document that corresponds to the attached document is already managed by the document management means, accumulates the attached document as the latest version of the relevant transaction document, and, when the transaction document is not managed, accumulates the attached document as the first version of a new document and registers the receiving information of the EDI data in the version control information.

(11) According to another aspect of the present invention, the document processing program has a program for executing a document management procedure including a procedure that assigns a version to a prepared transaction document and accumulates the document and a procedure that manages version control information for the accumulation, an EDI procedure that creates and sends EDI data for an electronic transaction and a linkage procedure that links the document management procedure and the EDI procedure and registers sending information of the EDI data in version control information of the relevant transaction document are executed when the accumulated transaction document and the version are selected and attached to the EDI data, then the EDI data is sent.

BRIEF DESCRIPTION OF THE DRAWINGS

Preferred embodiments of the present invention will be described in detail based on the followings, wherein:

FIG. 8 is a drawing showing the example of the version control information and an example of EDI historical information in the first embodiment of the present invention;

FIG. 9 is a drawing showing the example of the version control information and the example of the EDI historical information in the first embodiment of the present invention;

FIG. 10 is a drawing showing the example of the version control information in the first embodiment of the present invention;

FIG. 17 is a drawing showing a display example of a preparation history of the transaction document and a send and receive history by EDI.

DESCRIPTION OF PREFERRED EMBODIMENTS

The embodiments of the present invention are described below with reference to the drawings.

FIGS. 1 to 10 are drawings that describe a first embodiment of the present invention.

Figure 1:
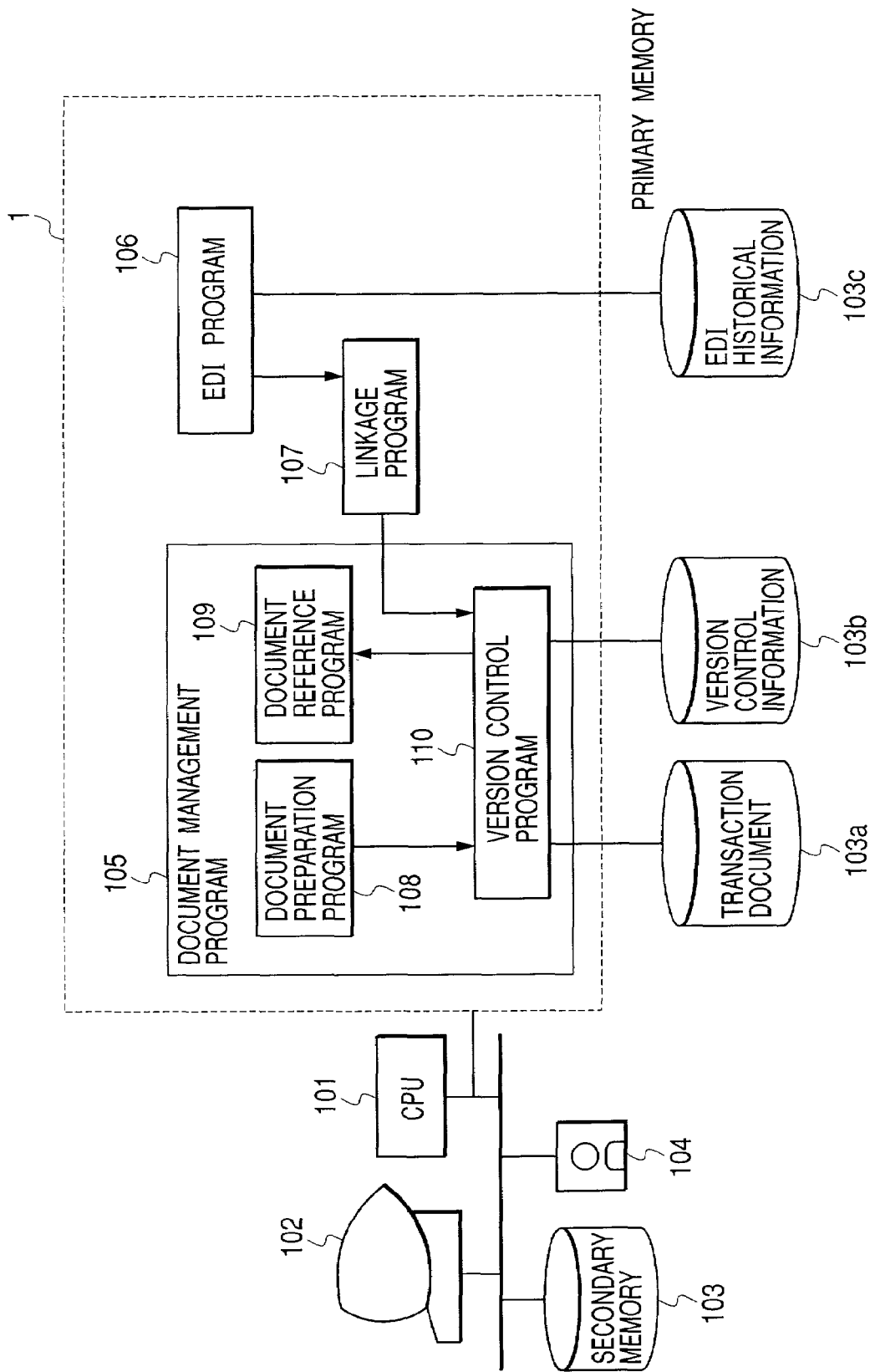
FIG. 1 is a drawing showing a first embodiment of the present invention.

FIG. 1 shows the first embodiment of the present invention.

In FIG. 1, 1 is a primary memory, 101 is a CPU, 102 is a terminal unit, such as a keyboard, 103 is a secondary memory for storing a transfer historical document, 104 is a storage medium for storing a program, 105 is a document management program, 106 is an EDI program, 107 is a document management/EDI linkage program, 108 is a document preparation program, 109 is a document reference program, 110 is a version control program, 103a is a secondary memory in which a transaction document is stored, 103b is a secondary memory in which version control information is stored, and 103c is a secondary memory in which EDI historical information is stored. The document management program 105 has the document preparation program 108, the version control program 110 and the document reference program 109. A transaction document prepared using the document management program 105 is attached to EDI data created using the EDI program 106 and the EDI data is sent. When the EDI data was sent, if a history indicating which version of which transaction document was attached is managed, the transaction document attached to the received EDI data is accumulated as the latest version of the relevant document or the sending using the EDI program 106 was disabled, a sending history of the relevant transaction document is deleted.

FIGS. 2 to 6 are flowcharts of processing in the first embodiment of the present invention.

Figure 2:
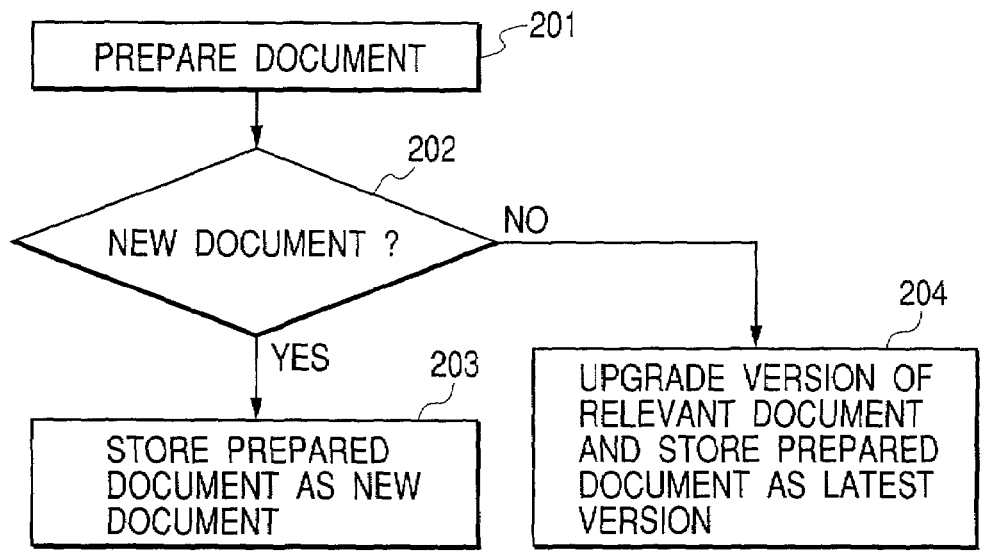
FIG. 2 is a drawing showing the preparation or update processing procedure of a document in the first embodiment of the present invention.

FIG. 2 shows a procedure for controlling a version of a document when the document is prepared and updated using the document management program 105. The procedure is as follows:

(1) Prepare a transaction document using the document preparation program 108 (step 201).

(2) When the prepared document is a new document, go to step 203. When the existing document was updated, go to step 204 (step 202).

(3) Store the transaction document prepared through the step 201 in the secondary memory 103a using the version control program 110. Further, at the same time, store version control information in the secondary memory 103b using the version control program 110 so that the stored transaction document can be managed as the first version (step 203).

(4) Store the transaction document prepared through the step 201 in the secondary memory 103a using the version control program 110. Further, upgrade the version of the relevant existing document and store the version control information in the secondary memory 103b using the version control program 110 so that the stored transaction document will be managed as the latest version (step 204).

Through the steps from 201 to 204, the preparation history of a transaction document can be managed as the version information of the document.

Figures 6, 7:
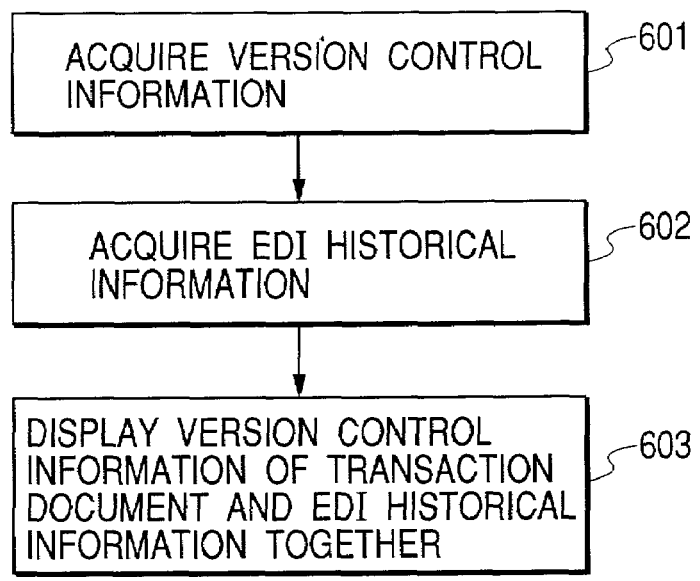
FIG. 6 is a drawing showing a processing example of displaying a preparation history and a send and receive history of the document in the first embodiment of the present invention.
FIG. 7 is a drawing showing an example of version control information in the first embodiment of the present invention.

FIG. 7 shows an example of the version control information of the secondary memory 103b stored through the steps. In FIG. 7, a "version name", an "implementor" and a "creation date" are provided as version control information 701. "Mr. Yamada" first prepares a relevant transaction document and "Mr. Sato" or "Mr. Suzuki" updates this document. By referring to this version control information, it can easily be judged who and when the transaction document was prepared and updated. Besides, the send and receive history shown in FIG. 7 is described later.

Figure 3:
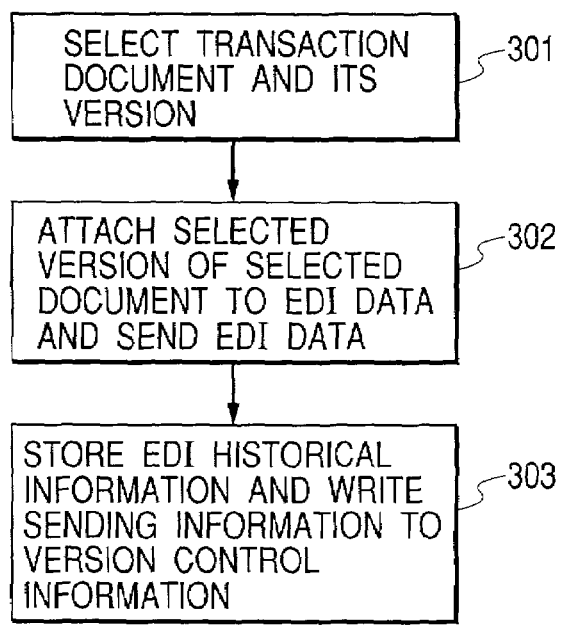
FIG. 3 is a drawing showing the processing that attaches the document to EDI data and sends the data in the first embodiment of the present invention.

FIG. 3 is a flowchart showing a procedure example when the prepared transaction document is attached to EDI data and the EDI data is sent. The procedure is as follows:

(1) Select a transaction document using the document reference program 109 and select a version referring to the version control information that corresponds to the transaction document using the version control program 110 (step 301).

(2) Attach the selected version of the selected document to EDI data using the linkage program 107 and send the EDI data using the EDI program 106 (step 302).

(3) Store EDI historical information in the secondary memory 103c using the EDI program 106 and write sending information to the version control information of the secondary memory 103b using the linkage program 107 (step 303).

Through the steps from 301 to 303, the preparation history of a transaction document and the sending history by EDI can be managed in a centralized manner based on the version control information.

FIG. 8 shows an example (801) of the version control information memorized in the secondary memory 103b and an example (802) of the EDI historical information memorized in the secondary memory 103c through the steps. FIG. 8 is an example when a modified version of the transaction document selected through the step 301 that corresponds to the version control information 801 is attached to EDI data of ID 10002 and the EDI data is sent. Through the step 303, the EDI data ID 10002 is written to the send and receive history of the version control information 801.

Figure 4:
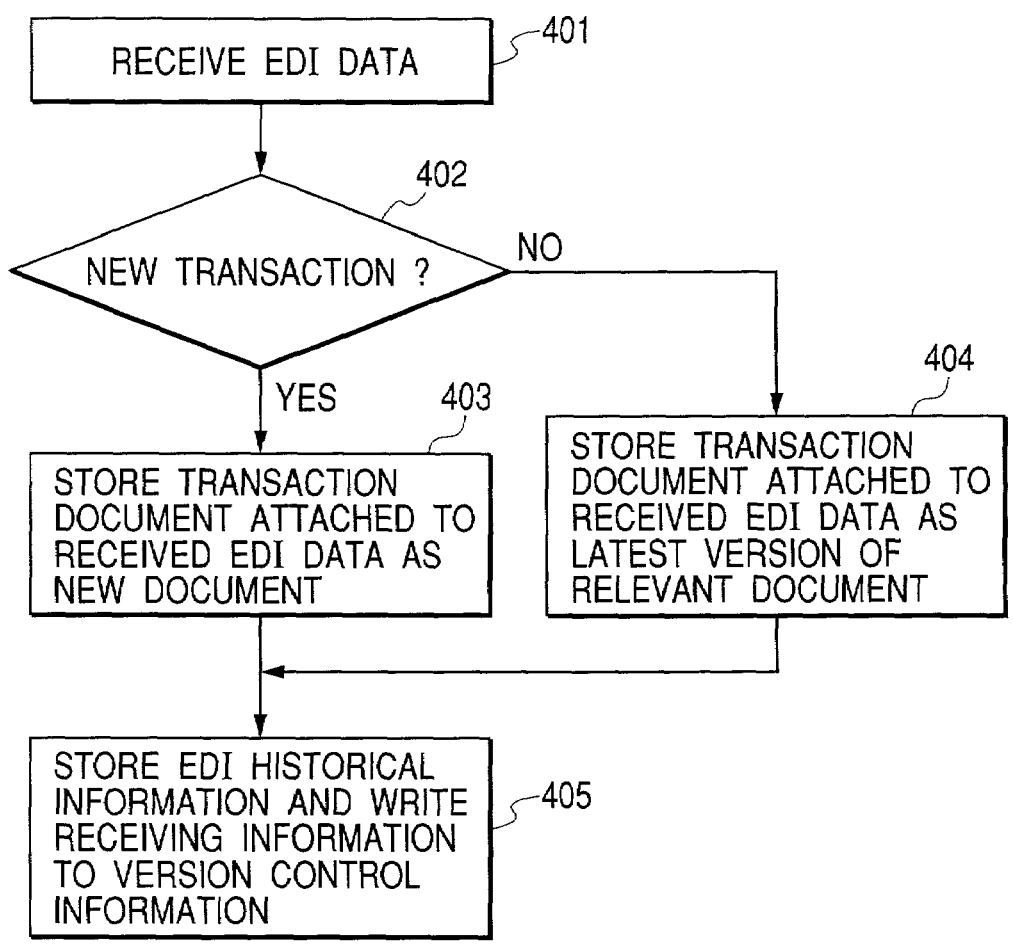
FIG. 4 is a drawing showing a processing procedure when the EDI data is received in the first embodiment of the present invention.

FIG. 4 is a flowchart of a processing procedure example when EDI data is received. The processing procedure at this point is as follows:

(1) Receive the EDI data using the EDI program 106 (step 401).

(2) Decide that the EDI data received through the step 401 is a new transaction. This decision can use whether the transaction No. (transaction number) of the EDI data is identical or not. For the start of the new transaction, go to step 403. When the transaction is already advancing, go to step 404 (step 402).

(3) Store the transaction document attached to the EDI data that was received through the step 401 in the secondary memory 103a. Further, at the same time, store version control information in the secondary memory 103b using the version control program 110 so that the stored transaction document can be managed as the first version. Go to step 405 (step 403).

(4) Store the transaction document attached to the EDI data that was received through the step 401 in the secondary memory 103a. Further, upgrade the version of the relevant existing document that is being transacted using the version control program 110 and store the version control information in the secondary memory 103b so that the stored transaction document can be managed as the first version. Go to the step 405 (step 404).

(5) Store EDI historical information in the secondary memory 103c using the EDI program 106 and write receiving information to the version control information 103b using the linkage program 107.

Through the steps from 401 to 405, the centralized management of a receive history by EDI is enabled in addition to the preparation history of a transaction document and a send history by the EDI.

FIG. 9 is an example (901) of the version control information stored in the secondary memory 103b and an example (902) of the EDI historical information stored in the secondary memory 103c through the steps. FIG. 9 is an example when EDI data of ID 10003 is received as an extension of the same transaction after the EDI data of ID 10002 is received. The transaction document attached to the EDI data that was received through the step 404 is stored as the latest version of the relevant existing document and the EDI data ID 10003 is written to the send and receive history of the version control information 901 through the step 405.

Figure 5:
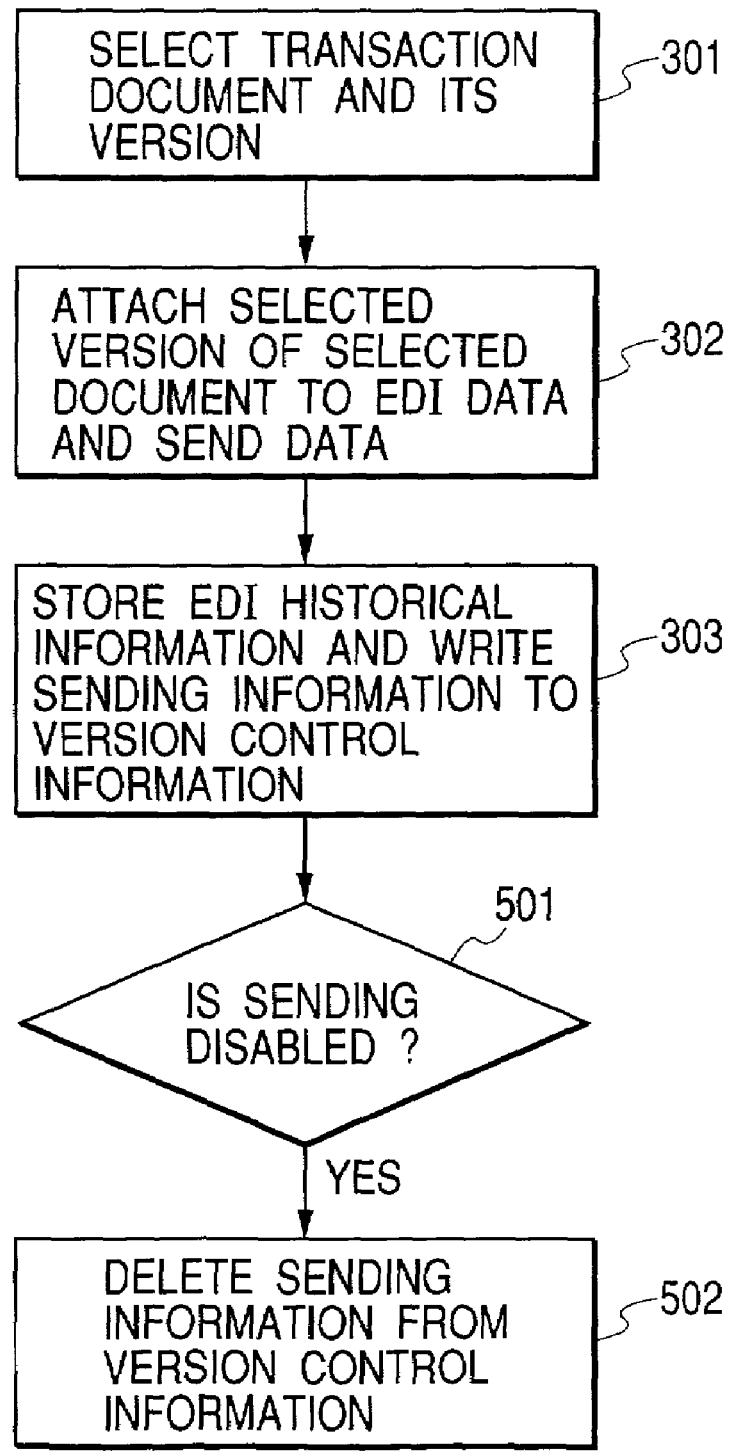
FIG. 5 is a drawing showing a processing example when the sending of the EDI data is disabled in the first embodiment of the present invention.

FIG. 5 shows a flowchart of the processing procedure example when the sent EDI data was disabled. The procedure in which the EDI data is sent is the same procedure as the steps from 301 to 303. The procedure is as follows.

(1) Decide that the sent EDI data was disabled using the EDI program 106. As examples in which sending will be disabled, there are a case where a sending error occurred in the EDI data due to a network failure and a case where a transaction was canceled because the receiving end did not receive the EDI data even if a fixed time limit was exceeded (step 501).

(2) When it was decided that the EDI data sent through the step 501 was disabled, delete sending information from the version control information 103b using the linkage program 107 (step 502).

Even if the sending of the EDI data was disabled through the steps 501 and 502, the preparation history of a transaction document and the send and receive history by EDI can be managed in a centralized manner.

FIG. 10 is an example of the version control information stored in the secondary memory 103b through the steps. The drawing shows an example (1001) of the version control information after the EDI data was sent through the steps from 301 to 303 and an example (1002) of the version control information after the sending was disabled through the steps 501 and 502. Sending information is deleted from the example 1002 of the version control information.

FIG. 6 is a flowchart of a processing procedure example when the preparation history of a transaction document and the send and receive history by EDI are displayed. The procedure is as follows:

(1) Acquire the version control information 103b that corresponds to a transaction document of which the history is to be displayed using the version control program 110 (step 601).

(2) Acquire the EDI historical information that corresponds to the send and receive history of the version control information acquired through the step 601 using the EDI program 106 (step 602).

(3) Display the version control information acquired through the step 601 and the EDI historical information acquired through the step 602 together using the document reference program 107 (step 603).

FIG. 17 shows a display example through the steps. As shown in this example, how a transaction document was prepared and when which version of which document were attached to EDI data, then the EDI data was sent and received can be known easily by displaying the preparation history of the transaction document and the send and receive history by EDI together.

According to the first embodiment, the preparation history of a transaction document and the transaction history of the EDI data to which this transaction document was attached can be managed in a centralized manner, and, moreover, the interchange history of the transaction document with a customer can be managed with consistency in accordance with settlements of EDI, such as document receiving or transaction cancellation. Through the steps in particular, the preparation history of the transaction document and the send and receive history by EDI can be managed in a centralized manner and referred to. Accordingly, even when work was performed complicatedly, such as the preparation and update of the transaction document and the sending, receiving and retransmission of the EDI data to which this transaction document was attached, it can be referred to easily when which version of which document was sent. Consequently, the transaction can be advanced efficiently and successively, and the contents can be checked quickly when a trouble occurred.

Figure 11:
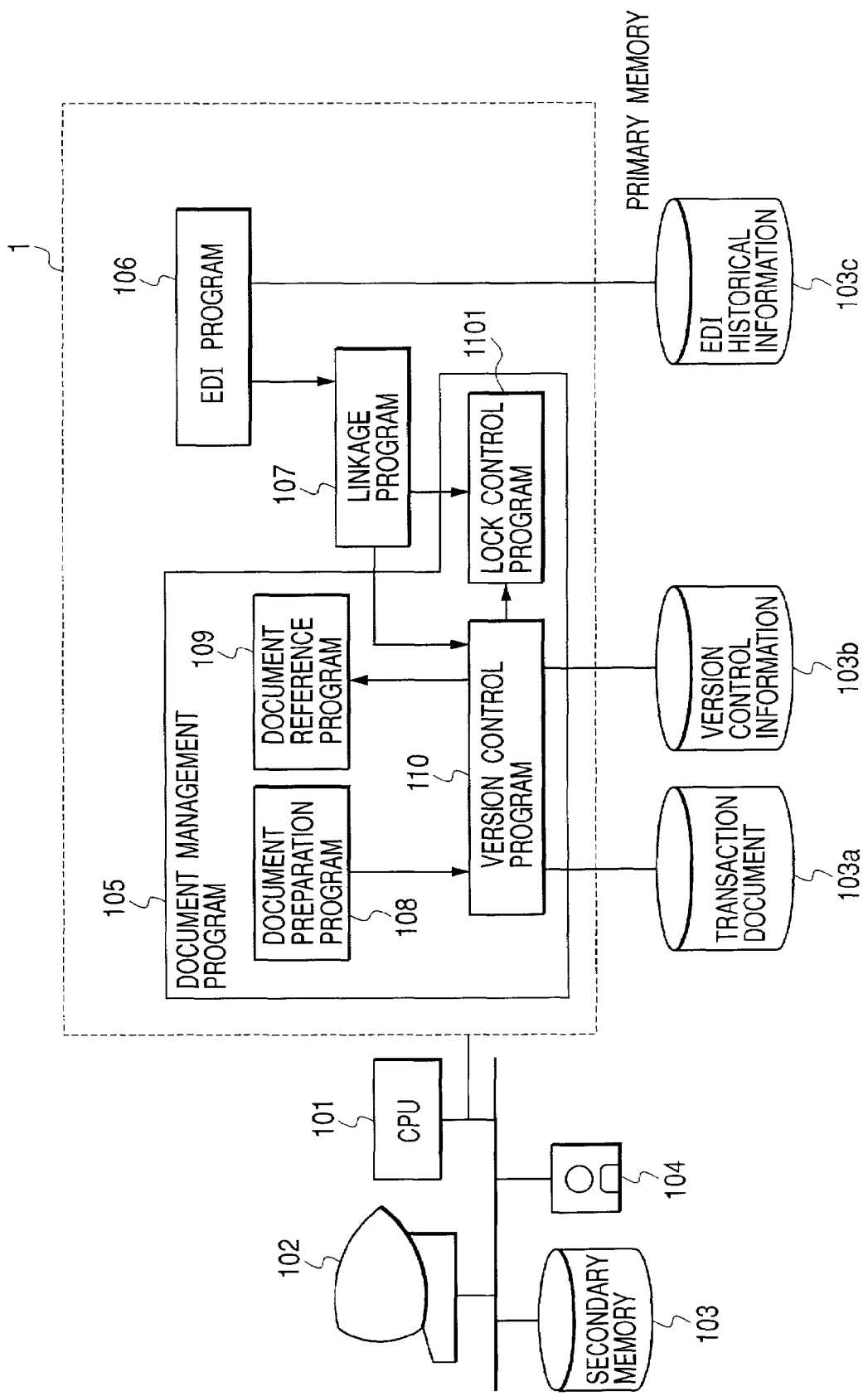
FIG. 11 is a drawing showing a second embodiment of the present invention.
Figure 12:
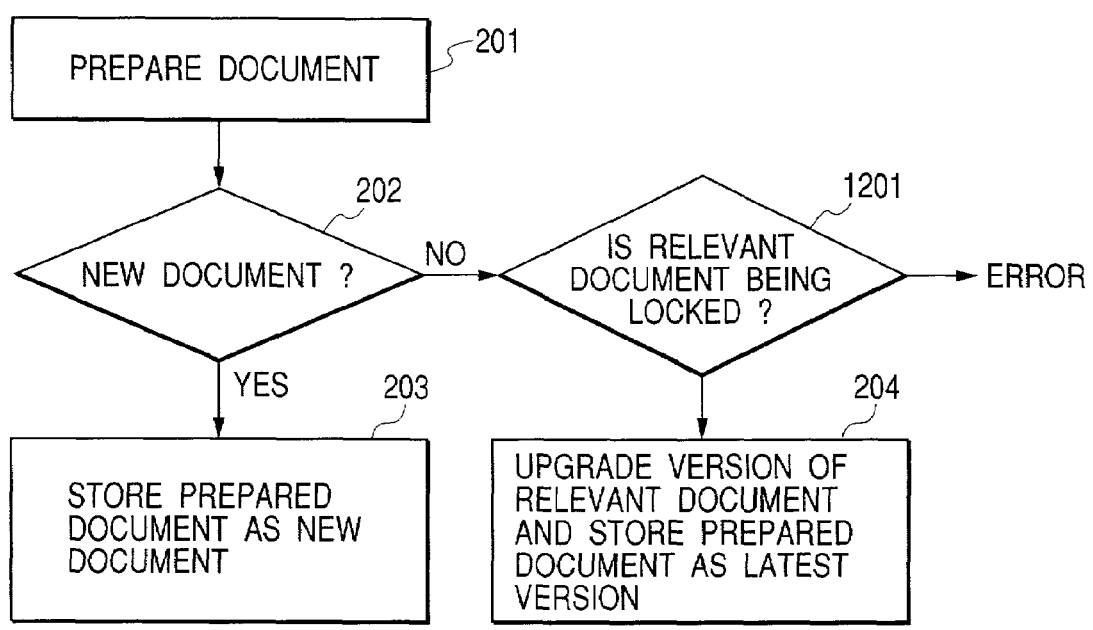
FIG. 12 is a drawing showing the preparation or update processing procedure of the document in the second embodiment of the present invention.
Figure 13:
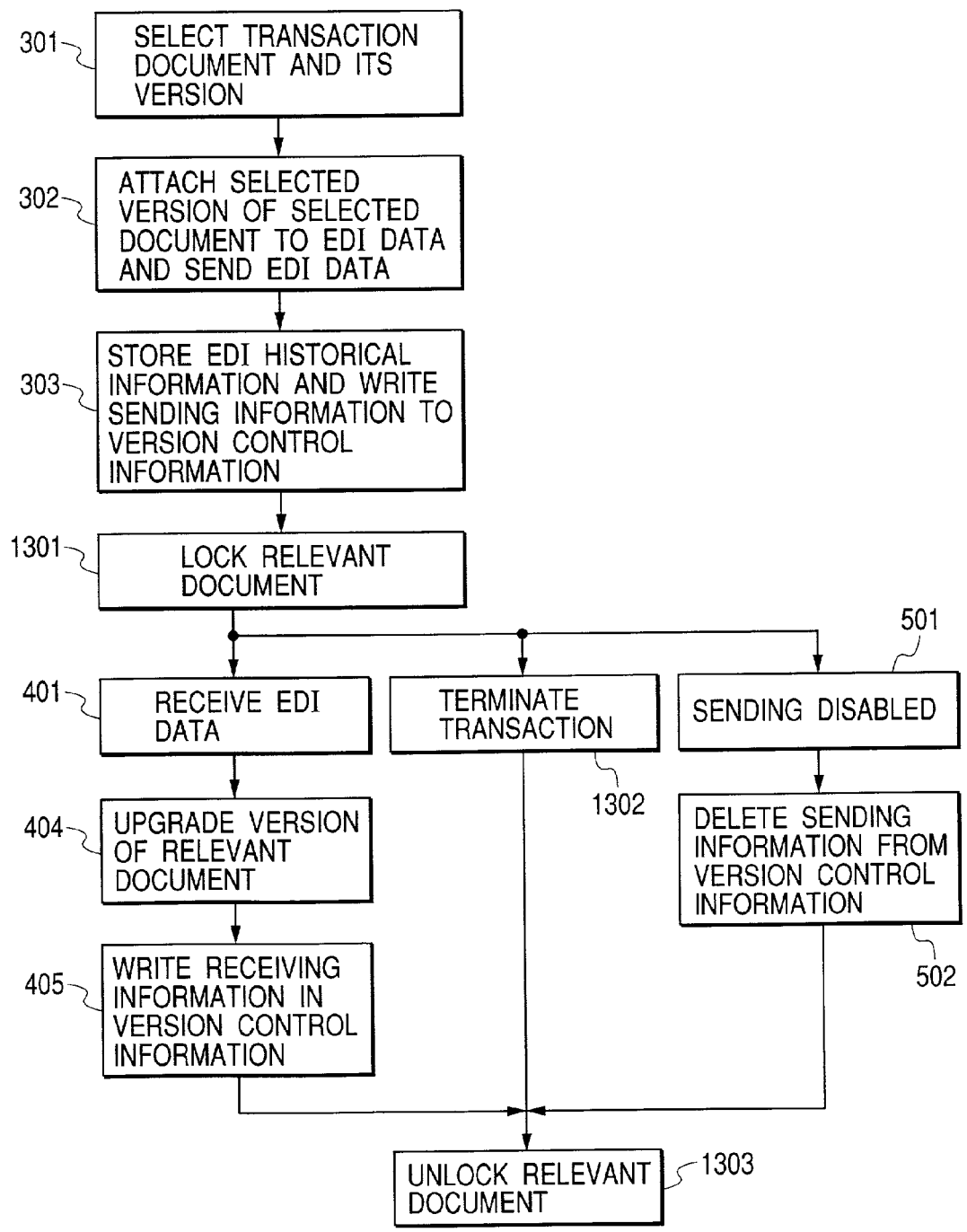
FIG. 13 is a drawing showing a processing procedure when the document is temporarily inhibited from being updated in the second example of the present invention.
Figure 14:
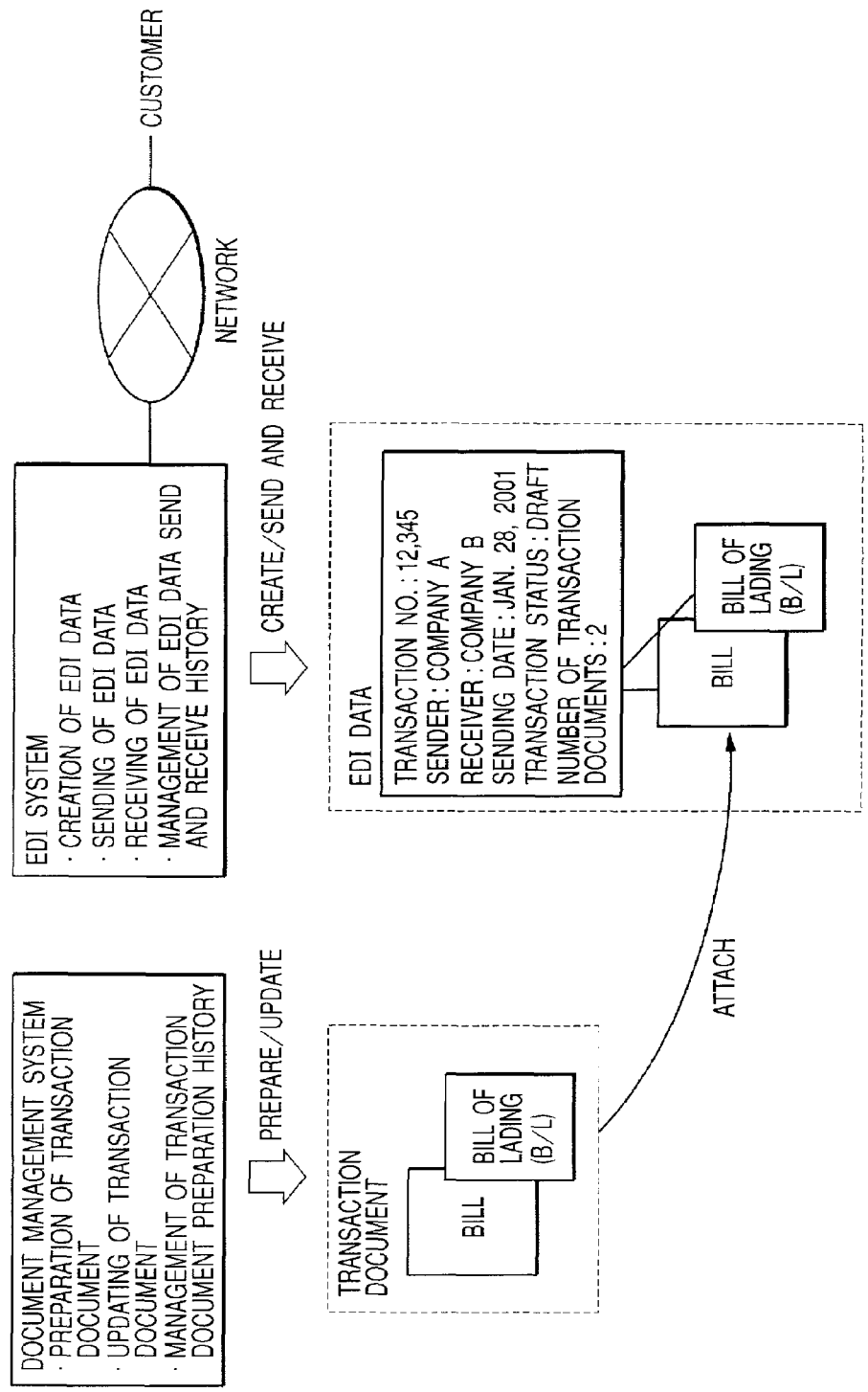
FIG. 14 is a drawing showing a linkage example between a document management system and an EDI system.
Figure 15:
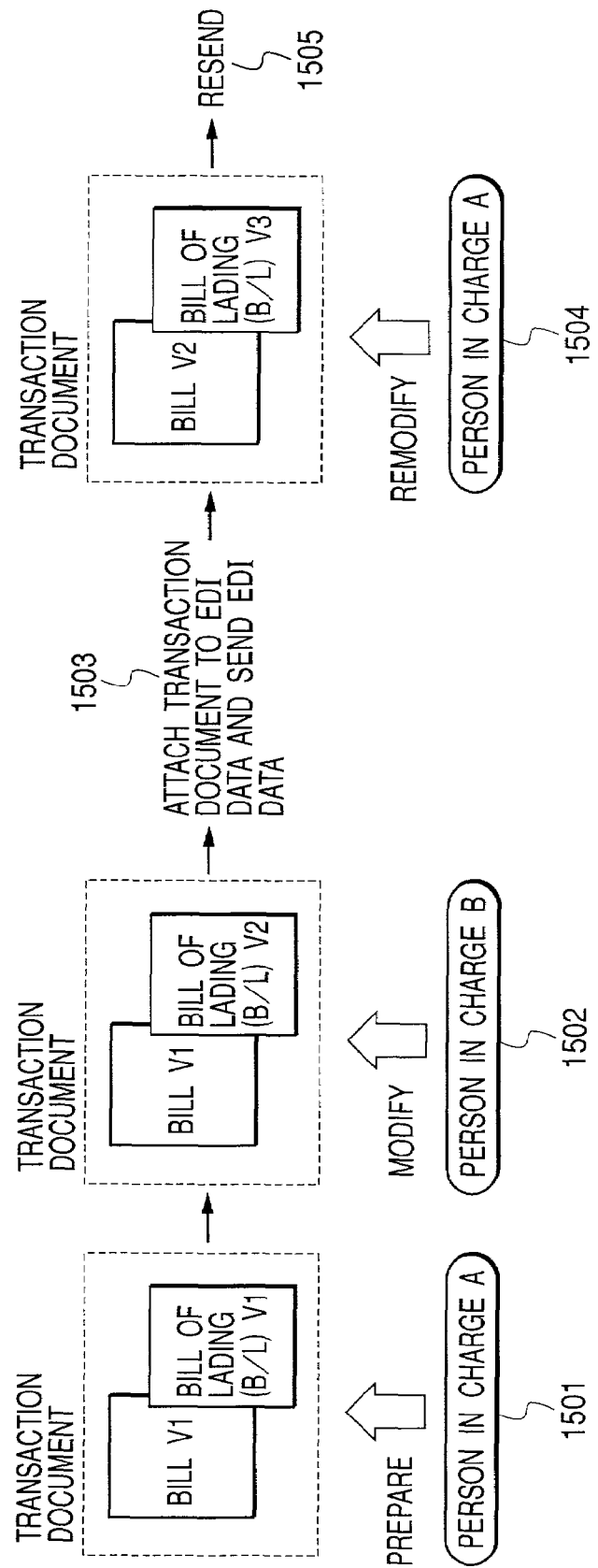
FIG. 15 is a drawing showing a procedure example when a transaction document is prepared, updated and attached to EDI data, and the data is sent.
Figure 16:
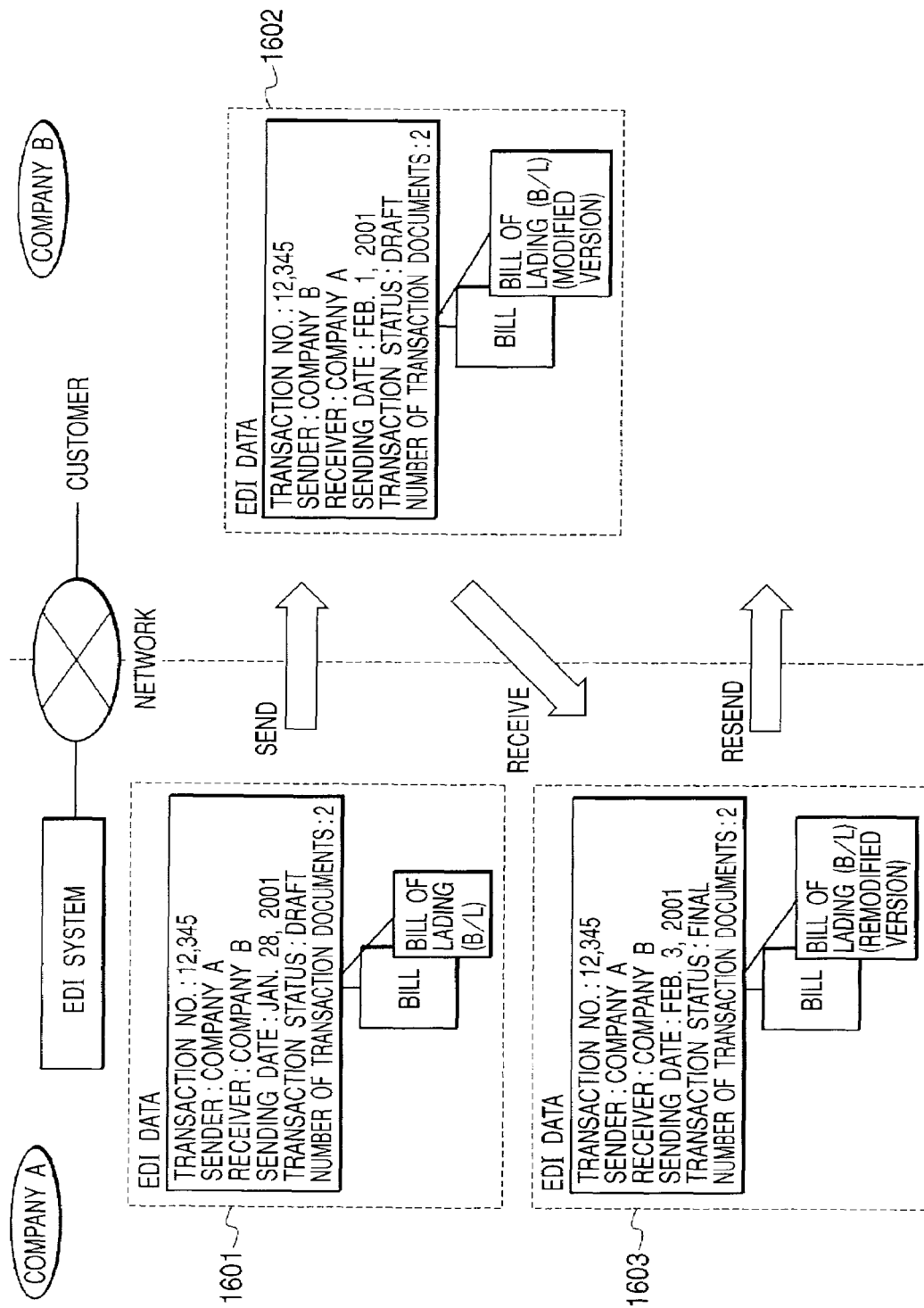
FIG. 16 is a drawing showing an example when the EDI data is interchanged with a customer.

FIGS. 11 to 13 are drawings for describing a second embodiment of the present invention.

FIG. 11 shows the second embodiment of the present invention. This embodiment is an example when the update of a transaction document can be inhibited temporarily.

In FIG. 11, 1 is the primary memory, 101 is the CPU, 102 is the terminal unit, such as the keyboard, 103 is the secondary memory for storing the transfer historical document, 104 is the storage medium for storing the program, 105 is the document management program, 106 is the EDI program, 107 is the document management/EDI linkage program, 108 is the document preparation program, 109 is the document reference program, 110 is the version control program, 1101 is a lock control program, 103a is the secondary memory in which the transaction document is stored, 103b is the secondary memory in which the version control information is stored and 103c is the secondary memory in which EDI historical information is stored. The document management program 105 is provided with the document preparation program 108, the version control program 110, the document reference program 109 and the lock control program 1101. In the same manner as the first embodiment, the transaction document prepared using the document management program 105 is attached to EDI data created using the EDI program 106 and the EDI data is sent. When the EDI data was sent, a history indicating which version of which transaction document was attached is managed and the transaction document attached to the received EDI data is accumulated as the latest version of the relevant document. When the sending using the EDI program 106 was disabled, the sending history of the relevant transaction document is deleted. Further, in this second embodiment, while a response from a customer is being awaited, the update of the transaction document can be inhibited temporarily, and a double update of the update of the transaction document in an enterprise and the update of the transaction document by the customer can be prevented.

FIGS. 12 and 13 are flowcharts of the processing procedure example in the second embodiment.

FIG. 12 shows a procedure for controlling a version of a document when the document is prepared and updated using the document management program 105. The procedure when a document is prepared anew, the version of the document is upgraded and the document is updated is the same procedure as the steps 201 to 204 in the first embodiment. However, whether the relevant document is being locked or not is checked before the version of the document is upgraded differs from the first embodiment. As the confirmation procedure, it is decided that the relevant document is being locked using the lock control program 1101. If the document is being locked, the update of the document is assumed to be an error. If the document is not being locked, go to the step 204 and update the document (step 1201).

FIG. 13 shows a flowchart of the processing procedure example when the update of a transaction document is inhibited temporarily in the course of a response from a customer by EDI. The procedure of FIG. 13 is as follows:

(1) Select a transaction document and its version and attach this document to EDI data, then send the EDI data. Subsequently, store the EDI historical information and write sending information to version control information (steps 301 to 303).

(2) Lock the sent transaction document using the lock control program 1101 (step 1301).

(3) Following the step 1301, the EDI data is received or a transaction is terminated or sending is disabled. However, the processing procedure when the EDI data was received is the same procedure as the steps from 401 to 405 and the processing procedure when the sending was disabled is the same procedure as the steps 501 and 502. The procedure when the transaction is terminated is shown through step 1302.

(4) It is decided that the transaction was terminated using the EDI program 106 (step 1302).

(5) When the EDI data was received, the transaction was terminated or the sending was disabled, go to step 1303 in the end.

(6) Unlock the relevant transaction document using the lock control program 1101 (step 1303).

According to the second embodiment, the preparation history of a transaction document and the transaction history of the EDI data to which this transaction document was attached can be managed in a centralized manner, and, moreover, the interchange history of the transaction document with a customer can be managed with consistency in accordance with settlements of EDI, such as document receiving or transaction cancellation. Through the steps in particular, when an electronic transaction is conducted through the steps, the relevant document is temporarily inhibited from being updated in the course of waiting for a response from the customer. When the document was received, the transaction was terminated or the sending was disabled, the update inhibition can be released. Accordingly, a double update of the update of the transaction document in an enterprise and the update of the transaction document by the customer can be prevented.

According to the present invention, the preparation history of a transaction document and the transaction history of the EDI data to which this transaction document was attached can be managed in a centralized manner, and, moreover, the interchange history of the transaction document with a customer can be managed with consistency even when work was performed complicatedly. Consequently, the efficiency of transaction operations is improved.

What is claimed is:

1. A document management/EDI system linkage unit, comprising:
   a document management means having an accumulation means that assigns a version to a prepared transaction document and accumulates the document and a version control means that manages version control information for the accumulation;
   an EDI means that creates and sends EDI data for an electronic transaction; and
   a linkage means that links the document management means and the EDI means, that acquires sending information of the EDI data from the EDI means, and that registers sending information of the EDI data in the version control information of the relevant transaction document when the accumulated transaction document and the particular version are selected and attached to the EDI data, wherein the EDI data is sent by the EDI means, wherein the EDI means comprises a means for receiving EDI data, and wherein the linkage means comprises a means which discerns a relevant transaction of the transaction document attached to the EDI data and, when a transaction document is attached to the received EDI data and the attached transaction document is discerned as a document of a transaction already in progress, accumulates the attached document as the latest version of the relevant transaction document which is managed with relation to the electronic transaction, and, when the attached transaction document is discerned as a document of a new electronic transaction, accumulates the attached document as the first version of a new document and registers receiving information of the EDI data in the version control information.

2. A document management/EDI system linkage unit, comprising:

a document management means having an accumulation means that assigns a version to a prepared transaction document and accumulates the document and a version control means that manages version control information for the accumulation;

an EDI means that creates and sends EDI data for an electronic transaction; and a linkage means that links the document management means and the EDI means, that acquires sending information of the EDI data from the EDI means, and that registers sending information of the EDI data in the version control information of the relevant transaction document when the accumulated transaction document and the particular version are selected and attached to the EDI data, wherein the EDI data is sent by the EDI means, wherein the linkage means deletes the sending information of the EDI data from the version control information when a sending error occurs or sending is disabled in the EDI data sent by the EDI means.

3. A document management/EDI system linkage unit, comprising:

a document management means having an accumulation means that assigns a version to a prepared transaction document and accumulates the document and a version control means that manages version control information for the accumulation;

an EDI means that creates and sends EDI data for an electronic transaction; and a linkage means that links the document management means and the EDI means, that acquires sending information of the EDI data from the EDI means, and that registers sending information of the EDI data in the version control information of the relevant transaction document when the accumulated transaction document and the particular version are selected and attached to the EDI data, wherein the EDI data is sent by the EDI means, wherein the document management means comprises a lock means for temporarily inhibiting the update of a document, and the linkage means temporarily inhibits the update of the relevant transaction document using the lock means when the transaction document is sent by the EDI means, and cancels update inhibition at least when the transaction document is received, a transaction is terminated and sending is disabled.

4. A document management/EDI system linkage method, comprising:

a document management step having an accumulation step that assigns a version to a prepared transaction document and accumulates the document and a version control step that manages version control information for the accumulation;

an EDI step that creates and sends EDI data for an electronic transaction; and a linkage step that links the document management step and the EDI step, acquires sending information of the EDI data in the EDI step, and registers the sending information in the version control information of the relevant transaction document when the accumulated transaction document and the version are selected and attached to the created EDI data, wherein the EDI data is sent in the EDI step, wherein in the EDI step the EDI data is received, and wherein in the linkage step, a relevant transaction of the transaction document attached to the EDI data is discerned and, when a transaction document is attached to the received EDI data and the attached transaction document is discerned as a document of a transaction already in progress, the attached document is accumulated as the latest version of the relevant transaction document which is managed with relation to the electronic transaction and, when the attached transaction document is discerned as a document of a new electronic transaction, the attached document is accumulated as the first version of a new document and the receiving information of the EDI data is registered in the version control information.

5. A document management/EDI system linkage method, comprising:

a document management step having an accumulation step that assigns a version to a prepared transaction document and accumulates the document and a version control step that manages version control information for the accumulation;

an EDI step that creates and sends EDI data for an electronic transaction; and a linkage step that links the document management step and the EDI step, acquires sending information of the EDI data in the EDI step, and registers the sending information in the version control information of the relevant transaction document when the accumulated transaction document and the version are selected and attached to the created EDI data, wherein the EDI data is sent in the EDI step, wherein the linkage step deletes the sending information of the EDI data from the version control information when a sending error occurred or sending was disabled in the EDI data sent in the EDI step.

6. A document management/EDI system linkage method, comprising:

a document management step having an accumulation step that assigns a version to a prepared transaction document and accumulates the document and a version control step that manages version control information for the accumulation;

an EDI step that creates and sends EDI data for an electronic transaction; and a linkage step that links the document management step and the EDI step, acquires sending information of the EDI data in the EDI step, and registers the sending information in the version control information of the relevant transaction document when the accumulated transaction document and the version are selected and attached to the created EDI data, wherein the EDI data is sent in the EDI step, wherein in the document management step, the update of a document is temporarily inhibited as a lock control, and in the linkage step, the update of the relevant transaction document is temporarily inhibited by executing the lock control when the transaction document was sent through the EDI step, and, update inhibition is canceled at least when the transaction document is received, a transaction is terminated, and sending is disabled.

7. An information recording medium of which the contents can be read on a computer, and that records a program for executing:

a document management procedure including an accumulation procedure by which a version is assigned to a prepared transaction document and the document accumulated, and a version control procedure by which version control information for the accumulation is managed;

an EDI procedure by which EDI data for an electronic transaction is created and sent by an EDI means; and a linkage procedure by which the document management procedure and the EDI procedure are linked, by which sending information of the EDI data in the EDI procedure is acquired and the sending information in the version control information of the relevant transaction document is registered when the accumulated transaction document and the particular version are selected and attached to the EDI data, wherein the EDI data is sent by the EDI means, wherein in the EDI procedure, the EDI data is received, and wherein in the linkage procedure, a relevant transaction of the transaction document attached to the EDI data is discerned and, when a transaction document is attached to the received EDI data and the attached transaction document is discerned as a document of a transaction already in progress, the attached document is accumulated as the latest version of the relevant transaction document which is managed with relation to the transaction and, when the transaction document is discerned as a document of a new transaction, the attached document is accumulated as the first version of a new document and the receiving information of the EDI data registered in the version control information.

8. The document management/EDI system linkage unit according to claim 2, wherein the document management means comprises a lock means for temporarily inhibiting the update of a document, and the linkage means temporarily inhibits the update of the relevant transaction document using the lock means when the transaction document is sent by the EDI means, and cancels update inhibition at least when the transaction document is received, a transaction is terminated and sending is disabled.

9. The document management/EDI system linkage method according to claim 5, wherein in the document management step, the update of a document is temporarily inhibited as a lock control, and in the linkage step, the update of the relevant transaction document is temporarily inhibited by executing the lock control when the transaction document was sent through the EDI step, and, update inhibition is cancelled at least when the transaction document is received, a transaction is terminated, and sending is disabled.

* * * * *